2,976,331
PREPARATION OF AROMATICS

Charles Newton Kimberlin, Jr., and William Judson Mattox, Baton Rouge, La., assignors to Esso Research and Engineering Company, a corporation of Delaware No Drawing. Filed July 31, 1957, Ser. No. 675,269

6 Claims. (Cl. 260—668)

The present invention relates to a novel chemical process for preparing relatively pure aromatic compounds and saturated compounds by transfer of hydrogen from a naphthenic compound to carbon to carbon multiple bonds over a crystalline zeolite catayst under selective critical conditions. More particularly, the present invention relates to a novel catalytic process for converting cycloparaffins and cycloolefins, such as cyclohexane and cyclohexene, to aromatic compounds such as benzene in the presence of a crystalline metallic alumino-silicate having uniform pore openings between about 6 and 15 Angstrom units. The present application is a continuation-in-part of Serial No. 656,183 filed May 1, 1957.

The production of aromatic hydrocarbons has become extremely important in recent years in view of the demands thereof as solvents, as chemical intermediates, and as components in high octane number motor gasolines. Although large quantities of aromatics are currently being produced by coal distillation and especially by the hydroforming of petroleum naphthas, the demand for aromatics still exceeds the supply. Accordingly, there is a definite need for new sources of aromatics and new or improved methods of preparing aromatics.

It is the object of this invention to provide the art with a novel method for producing aromatics.

It is also the object of this invention to provide the art with a novel method for converting cyclic olefinic hydrocarbons into aromatics.

It is a further object of this invention to provide the art with a simple, effective method for converting low molecular weight or $C_2$ to $C_7$ olefins into lower boiling aromatics as well as higher boiling olefins into high molecular weight aromatics.

It is a still further object of the present invention to provide a catalytic method for converting cyclic hydrocarbons to aromatics by a hydrogen transfer process. These and other objects will appear more clearly from the detailed specification and claims that follow.

Hydrogen transfer reactions involve a catalytic system wherein one of the constituents is a supplier of hydrogen atoms and another constituent is an acceptor of hydrogen. Thus, a mixture of cyclohexane and propylene would be converted to benzene and propane, the hydrogen of the alicyclic compound being accepted by the propylene.

The process of the present invention is particularly applicable to catalyzed reactions in which hydrogen is directly transferred between naphthenic compounds and unsaturated compounds capable of saturation at one or more bonds, both double and triple. Thus, the process is suited to simultaneous conversion of naphthenes to aromatic compounds and the conversion of olefins to paraffins using solely the hydrogen removed from the naphthene. Similarly, if a cyclic olefin is employed as feed, a portion acts as hydrogen donor and is converted to the aromatic, while another portion acts as acceptor and is converted to the corresponding saturated ring compound.

In accordance with the present invention, it has been found that aromatic compounds may be obtained in good yields by contacting an organic hydrogen donor and an acceptor, preferably a cyclic hydrocarbon and an olefin, with a metallic crystalline alumino-silicate at a temperature of about 350° to 850° F.

High yields of crystalline alumino-silicates having high hydrogen transfer activity can be obtained by vigorously intermixing, under carefully controlled conditions, of certain forms of sodium silicate and sodium aluminate in certain proportions followed by heat aging under relatively mild conditions to develop the desired crystalline form. The crystalline alumino-silicate is then separated from the reaction solution as by filtration and then washed with water, dried and activated by calcining. If desired, the alumino-silicate may be ion exchanged before or after drying by contacting the same with an aqueous solution of the desired metal salt.

In order to obtain rapid production of crystals it is essential to employ as one reactant a sodium silicate having a high ratio of soda to silica, i.e., at least 0.8/1 and possibly as high as 2/1. The preferred ratio of soda to silica is 1/1 and the preferred reagent is sodium metasilicate. The concentration of the sodium silicate may be in the range of about 30 to 300 grams of $SiO_2$ per liter, preferably about 100 to 200 grams per liter.

The composition of the sodium aluminate is less critical than that of the sodium silicate. Sodium aluminate having a ratio of soda to alumina in the range of 1/1 to 3/1 may be employed, but it is preferred to use those sodium aluminates having a relatively high ratio, say 1.5/1 soda to alumina ratio. The sodium aluminate concentration may be in the range of from about 40 to 400 grams $Al_2O_3$ per liter, and preferably is about 200 to 300 grams per liter.

The amount of sodium silicate and sodium aluminate solution used should be such that the ratio of silica to alumina in the final mixture is in the range of 3/1 to 10/1, preferably about 4/1 to 6/1. The mixing is ordinarily effected at ambient temperatures and should be rapid and efficient as in the impeller zone of a centrifugal pump.

The mixture is thereupon passed to a heater zone and heated to about 180° to 250° F. or more. During the time of passage through the heated zone, the reaction slurry undergoes crystallization to give the desired structure. At about 210° F. crystal formation is completed in about 3 to 24 hours. At higher temperatures shorter times are required for completion of the crystal formation, while at lower temperatures, somewhat longer time periods are required. After crystal formation of the precipitated sodium alumino-silicate has been completed, the reaction mixture is filtered and the alumino-silicate washed free of soluble materials by means of water. The material may then be dried as by heating to about 250° F. and then activated by calcination at temperatures in the range of 400° to 1000° F., preferably at about 700° to 900° F. The product has the approximate formula $Na_2O.Al_2O_3.2.7SiO_2$.

The physical and/or catalytic properties of the alumino-silicates may then be modified by base exchanging at least part of the sodium ions in the sodium alumino-silicate with other ions. For this purpose, solutions of calcium or magnesium salts may be utilized or, if it is desired to further increase the catalytic activity or vary the pore opening, the zeolite can be impregnated or base exchanged with salts of chromium, molybdenum, nickel, cobalt, zinc, vanadium, zirconium, tungsten, metals from groups IIA, IIB, VIB, VIIB and VIII of the periodic table, or other metals which also promote the formation of aromatics. The catalyst may have the empirical formula $$\frac{Me_2O}{n} \cdot Al_2O_3 \cdot 2.7SiO_2$$

wherein Me is the metal and $n$ is the valence of said metal.

Various ion exchanged alumino-silicates are conveniently prepared from water soluble salts such as $CrCl_2$, $NiCl_2$, $CoCl_2$, $CaCl_2$, $ZnCl_2$, $MgSO_4$, etc., by the following general procedure. Four hundred grams of zinc chloride (or sulfate) is dissolved in 1500 cc. of water. To this solution (at about 80° to 100° F.) 500 grams of the dry sodium alumino-silicate is added slowly with stirring. Occasional agitation is continued for about two hours. The liquid layer is then decanted, the aluminosilicate washed twice with distilled water, and a fresh solution of $ZnCl_2$ (400 grams/1500 cc. $H_2O$) added and allowed to stand, with occasional shaking, in contact with the adsorbent for 2 to 4 hours. The aqueous layer is decanted and the adsorbent washed with distilled water until the wash water is free of soluble salts. The adsorbent is dried in an oven at 225° to 250° F. and then calcined at 850° F. for two hours. This procedure is adaptable to a number of variations, such as the use of alcohol-water solvents, etc., to increase the solubility of certain salts.

Cyclic hydrocarbons suitable for conversion to aromatics by the use of metallo-alumino-silicate catalysts will comprise a wide variety of saturated and naphthenic compounds, such as cyclohexane, cyclohexene, decalin, tetralin, phenylcyclohexane, dicyclohexyl, etc., and their homologues.

The reaction may be carried out at atmospheric pressure, although somewhat elevated pressures will usually be advantageous but preferably below about 750 p.s.i.g. Temperatures of about 350° to 850° F. will usually be suitable and in most instances a preferred range is about 400° to 750° F. Within these ranges of temperature and pressure, feed rates measured as w./hr./w. may vary from about 0.05 to about 5 depending upon the olefinicity of the feed, catalyst activity, and the desired level of conversion. Since the catalyst employed in these conversions is also a strong adsorbent for the aromatics produced, it will usually be preferred, in fixed-bed operations, to periodically interrupt the feed and recover the aromatics by suitable desorption, such as steaming followed by air-blowing to re-dry, evacuation, or purging.

EXAMPLE 1

Propylene and cyclohexane were passed in a mol ratio of 2.9/1 in vapor phase at atmospheric pressure and 400° F. over a fixed bed of a crystalline calcium alumino-silicate having pore openings of about 10 Angstrom units, prepared in a manner described previously. The cyclohexane feed rate was 0.1 vol./vol. of catalyst/hour. After 2¼ hours the feed was interrupted and the adsorbed hydrocarbons recovered from the catalyst by steam desorption at 400° F. The following tabulation shows the yields and products obtained.

Hydrogen transfer between cyclohexane and propylene calcium alumino-silicate catalyst

[Temp.: 400° F.; pressure: atm.; $C_3H_6/C_6H_{12}$ mol. ratio: 2.9]

Cyclohexane conversion, wt. percent of feed _____ 12.0
Product yields, wt. percent of $C_6H_{12}$ fed:
    Benzene _____ 1
    Di-isopropylbenzene _____ [1] 23.1
    Propane _____ 18.9

[1] Refractive index 1.4835 (25° C.); boiling point 202° C.; literature values for 1,3-diisopropylbenzene: R.I. 1.4854; B.P. 203° C.

The diisopropyl benzenes formed in this experiment were produced by alkylation of the benzene initially formed.

EXAMPLE 2

In a series of experiments, cyclohexene was vaporized and fed at atmospheric pressure to a fixed bed of metallic alumino-silicate maintained at a temperature of 400° F. The cyclohexene feed rate was 0.1 v./v./hr. Feed was discontinued after 9 to 10 volumes of effluent/100 volumes of catalyst had been collected. The adsorbed hydrocarbon was then recovered from the alumino-silicate catalyst by steam desorption and analyzed along with the unadsorbed effluent. For comparison, the calcium, zinc, sodium and potassium forms of the zeolite were tested. For further comparison, a crystalline zeolite having the formula $Na_2O \cdot Al_2O_3 \cdot 2SiO_2$ was employed. Here the pores had a uniform diameter of 5 Angstroms. The following tabulation summarizes the results of these evaluations.

Comparison of metal exchanged alumino-silicates as hydrogen transfer catalysts cyclohexene feed

[Temp.: 400° F.; pressure: atm.; feed rate: 0.1 v./v./hr.]

| Test No. | Alumino-Silicate Catalyst | Yields, Volume Percent | | | |
|---|---|---|---|---|---|
| | | Benzene+Substituted Benzenes [1] | Cyclohexane | Methyl Cyclopentane | Cyclopentene |
| 523 | Ca-13A | 26 | 18 | 3 | 53 |
| 547 | Zn-13A | 11 | 29 | 5 | 55 |
| 548 | Na-13A | 35 | 2 | 0 | 63 |
| 546 | K-13A | 0 | 0 | 0 | 100 |
| 545 | Ca-4A | 4 | 0 | 0 | 96 |

[1] Some phenyl cyclohexane and diphenyl formed, especially in tests 523 and 548.

These data show clearly the catalytic activity of alumino-silicates having large pore openings, the calcium, zinc, and sodium forms being catalytically active while the potassium form showed no measurable activity at the conditions used. The smaller pore zeolite, calcium 4A with 5 A. pore openings, gave only a very poor conversion. Thus, the catalytic activity of the metal exchanged alumino-silicates is dependent on both (1) pore openings of sufficient diameter to freely admit the reactants and also to permit desorption of the reaction products and (2) the molecular affinity exhibited by the metal ion for the hydrocarbon reactants, this affinity, in turn, being related inversely to the atomic radius. Thus, in group IA sodium has an atomic radius of 0.95 A. and potassium a value of 1.33 A., the sodium being the more active form of the 13A sieve for hydrogen transfer. Calcium being in group IIA, and zinc, in group IIB, are not comparable on the basis of atomic radii.

What is claimed is:

1. A method for simultaneously effecting the catalytic dehydrogenation of a naphthenic hydrocarbon to an aromatic and the catalytic hydrogenation of an olefin to paraffins which comprises contacting a stream consisting of at least one naphthenic hydrocarbon and at least one olefin with a hydrogen transfer catalyst at a temperature in the range of about 350° to 850° F., a pressure in the range of about atmospheric to 750 p.s.i.g. and a feed rate in the range of about 0.05 to 5.0 w./hr./w., said catalyst comprising a crystalline metallo-alumino-silicate having uniform pore openings of from about 10 to 13 Angstrom units and wherein the metal constituent is a metal selected from the group consisting of sodium, vanadium, zirconium, group IIA, IIB, VIB, VIIB and VIII of the periodic table.

2. The process of claim 1 wherein said catalyst has the empirical formula $$\frac{Me_2O}{n} \cdot Al_2O_3 \cdot 2.7SiO_2$$

wherein Me is the metal constituent and $n$ is the valence of said metal constituent.

3. The process of claim 1 wherein said catalyst has the formula $Na_2O.Al_2O_3.2.7SiO_2$.

4. The method of claim 1 wherein said naphthenic hydrocarbon is cyclohexane and said olefin is propylene.

5. An improved process for converting a cyclic olefinic hydrocarbon to an aromatic and a saturated cyclic hydrocarbon which comprises contacting a stream consisting of at least one cyclic olefinic hydrocarbon with a hydrogen transfer catalyst at a temperature in the range of about 350° to 850° F., a pressure in the range of about atmospheric to 750 p.s.i.g., and a feed rate in the range of about 0.05 to 5.0 w./hr./w., said catalyst comprising a crystalline metallo-alumino-silicate having uniform pore openings of from about 10 to 13 Angstrom units and wherein the metal constituent is a metal selected from the group consisting of sodium, vanadium, zirconium, group IIA, IIB, VIB, VIIB and VIII of the periodic table.

6. The process of claim 5 wherein said cyclic olefinic hydrocarbon is cyclohexene.

References Cited in the file of this patent

UNITED STATES PATENTS

| | | |
|---|---|---|
| 1,728,732 | Jaeger | Sept. 17, 1929 |
| 2,283,172 | Bates | May 19, 1942 |
| 2,378,057 | Yarnall | June 12, 1945 |
| 2,626,286 | Voorhies et al. | Jan. 20, 1953 |
| 2,689,305 | Plank et al. | Dec. 28, 1954 |
| 2,834,429 | Kinsella et al | May 13, 1958 |

OTHER REFERENCES

Breck et al.: Jour. Amer. Chem. Soc., vol. 78, No. 23, Dec. 8, 1956, pp. 5963–5971 (page 5964 only relied on).

Physical Properties of Linde Molecular Sieves (Types 4A, 5A, 13X), Form 9947 (1 page), Linde Air Products Col, 30 East 42nd Street, New York 17, New York (1957).

UNITED STATES PATENT OFFICE
CERTIFICATE OF CORRECTION

Patent No. 2,976,331            March 21, 1961

Charles Newton Kimberlin, Jr., et al.

It is hereby certified that error appears in the above numbered patent requiring correction and that the said Letters Patent should read as corrected below.

Column 3, lines 4 and 5 and column 4, lines 74 and 75, the formula, each occurrence, should appear as shown below instead of as in the patent:

$$\mathrm{Me}_{\frac{2}{n}}\mathrm{O} \cdot \mathrm{Al}_2\mathrm{O}_3 \cdot 2.7\mathrm{SiO}_2$$

Signed and sealed this 7th day of December 1965.

(SEAL)
Attest:

ERNEST W. SWIDER            EDWARD J. BRENNER
Attesting Officer            Commissioner of Patents